United States Patent
Koike et al.

(10) Patent No.: US 9,173,346 B2
(45) Date of Patent: Nov. 3, 2015

(54) RIDING MOWER WITH BLADE MOTOR CONTROL

(75) Inventors: Kazuo Koike, Kobe (JP); Hirokazu Ito, Izumisano (JP)

(73) Assignee: KUBOTA CORPORATION, Osaka (JP)

( * ) Notice: Subject to any disclaimer, the term of this patent is extended or adjusted under 35 U.S.C. 154(b) by 124 days.

(21) Appl. No.: 13/242,013

(22) Filed: Sep. 23, 2011

(65) Prior Publication Data
US 2012/0227369 A1 Sep. 13, 2012

(30) Foreign Application Priority Data
Mar. 9, 2011 (JP) .................................. 2011-052003

(51) Int. Cl.
| | | |
|---|---|---|
| *A01D 75/18* | (2006.01) | |
| *A01D 69/02* | (2006.01) | |
| *A01D 34/78* | (2006.01) | |
| *B60L 1/00* | (2006.01) | |
| *B60L 11/14* | (2006.01) | |
| *B60L 11/18* | (2006.01) | |
| *B60L 15/20* | (2006.01) | |

(52) U.S. Cl.
CPC ................ *A01D 69/02* (2013.01); *A01D 34/78* (2013.01); *B60L 1/003* (2013.01); *B60L 11/14* (2013.01); *B60L 11/1803* (2013.01); *B60L 15/2036* (2013.01); *B60L 2200/40* (2013.01); *B60L 2220/44* (2013.01); *B60L 2240/12* (2013.01); *B60L 2240/24* (2013.01); *B60L 2240/421* (2013.01); *B60L 2240/423* (2013.01); *B60L 2240/461* (2013.01); *B60L 2250/24* (2013.01); *B60L 2250/26* (2013.01)

(58) Field of Classification Search
USPC .................................. 56/10.2 R, 11.9; 460/7
See application file for complete search history.

(56) References Cited

U.S. PATENT DOCUMENTS 3,721,076 A * 3/1973 Behrens ........................ 56/14.9
5,251,430 A * 10/1993 Matsumoto et al. ............ 56/17.5
5,502,957 A * 4/1996 Robertson ...................... 56/11.9
(Continued)

FOREIGN PATENT DOCUMENTS

| JP | 9-201126 | 8/1997 |
|---|---|---|
| JP | 2003-310026 | 11/2003 |

(Continued)

OTHER PUBLICATIONS

U.S. Appl. No. 13/046,278 to Akira Minoura et al., filed Mar. 11, 2011.
(Continued)

*Primary Examiner* — Alicia Torres
(74) *Attorney, Agent, or Firm* — Greenblum & Bernstein, P.L.C.

(57) ABSTRACT

The present invention provides a riding work vehicle that includes a vehicle body having a driver seat; a driving wheel unit supporting the vehicle body; a working electric motor that drives a work unit having a work device; an electric motor controller controlling an operation of the working electric motor in a steady mode or a power saving mode in which consumed power is smaller than the steady mode; and a work load evaluator that evaluates load of the working electric motor. In the riding work vehicle, the electric motor controller operates the working electric motor in the power saving mode in a case where the load of the working electric motor evaluated by the work load evaluator is low load lower than a threshold value.

14 Claims, 9 Drawing Sheets

(56) References Cited

U.S. PATENT DOCUMENTS

| | | |
|---|---|---|
| 5,906,088 A | 5/1999 | Inui et al. |
| 6,734,647 B2* | 5/2004 | Wakitani et al. ............... 318/432 |
| 8,154,232 B2* | 4/2012 | Reichenbach et al. ... 318/400.09 |
| 2002/0100265 A1* | 8/2002 | Mil'shtein et al. .............. 56/11.9 |
| 2008/0086997 A1* | 4/2008 | Lucas et al. .................... 56/10.6 |
| 2008/0120955 A1* | 5/2008 | Lucas et al. .................... 56/10.6 |
| 2009/0260901 A1 | 10/2009 | Ishii et al. |
| 2010/0206647 A1 | 8/2010 | Ishii et al. |
| 2011/0259012 A1 | 10/2011 | Tada et al. |
| 2011/0289896 A1* | 12/2011 | Sasahara et al. ............... 56/11.9 |

FOREIGN PATENT DOCUMENTS

| | | |
|---|---|---|
| JP | 2004-194422 | 7/2004 |
| JP | 2009-255840 | 11/2009 |
| JP | 2010-184636 | 8/2010 |

OTHER PUBLICATIONS

U.S. Appl. No. 13/241,981 to Kazuo Koike et al., filed Sep. 23, 2011.
U.S. Appl. No. 13/242,041 to Hiroyuki Tada et al., filed Sep. 23, 2011.
U.S. Appl. No. 13/242,079 to Kazuo Koike et al., filed Sep. 23, 2011.
Japanese Office Action issued in counterpart application No. 2011-052003.

* cited by examiner

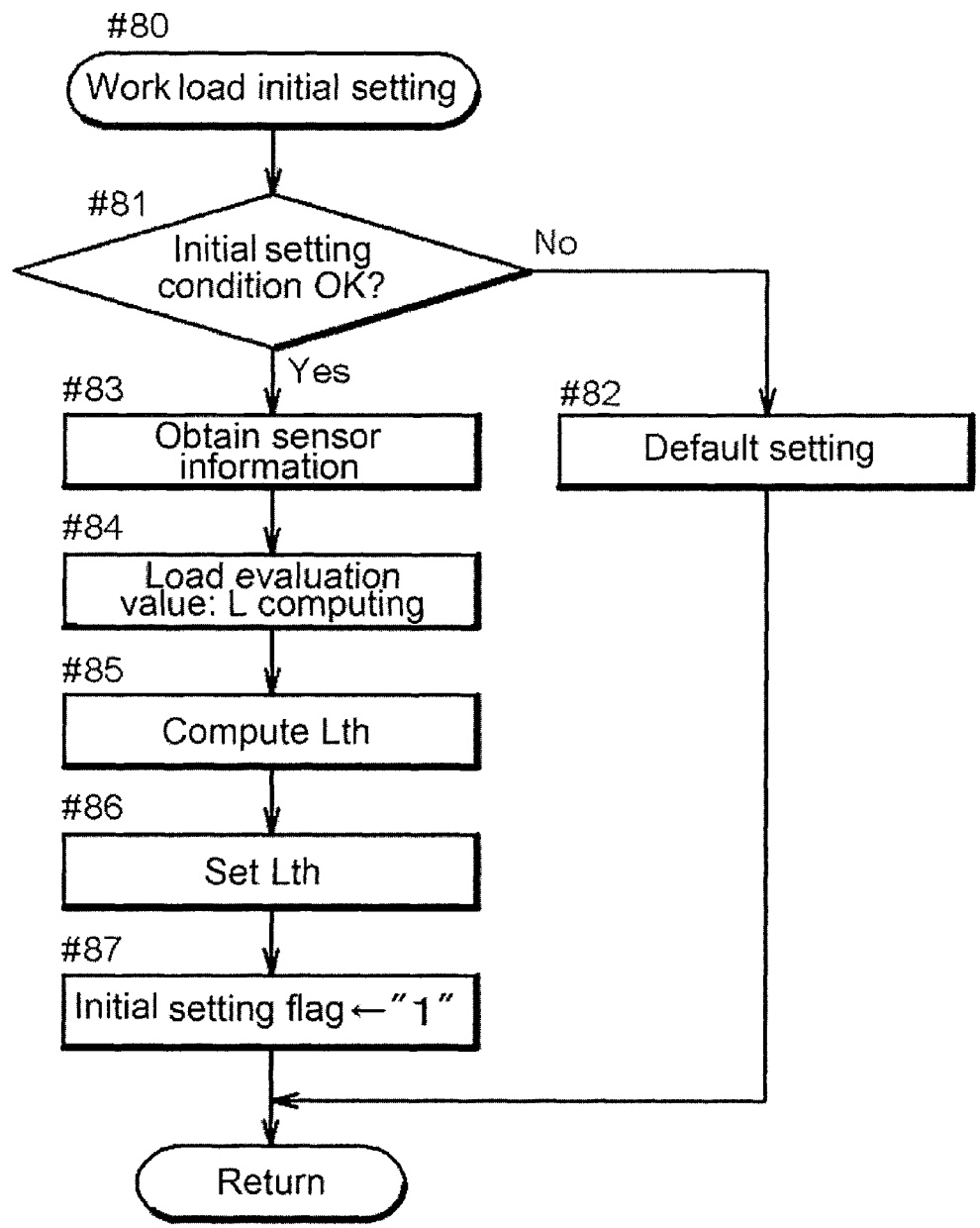

ically utilize electric power so as to perform mowing work for a long period of time because the battery is small and the capacity is small. In such an electric mower, described in Related Art 3 for example, a battery is connected to a direct-current electric motor in which a mowing edge is attached to an output shaft, and a control unit increasing and decreasing supply current to the electric motor depending on increase and decrease of load is connected between the electric motor and the battery, so as to maintain the rotation number of the electric motor to be substantially uniform at a minimum rotation number or a rotation number close to the minimum rotation number which enables a normal operation of the mowing edge even at heavy load. This control unit reduces power consumption of the electric motor at heavy load to be a minimum necessary for mowing; reduces power consumption more than necessary by curbing the rise of the rotation number of the electric motor at low load; and reduces change in the power consumption with respect to change in the load. That is, control is performed to make the rotation speed of the electric motor uniform as much as possible irrespective of the change in the load. The riding mower, however, performs mowing work in a broad area while running at a much higher speed than a walking speed by using a motor or an engine, and the work load frequently changes depending on the running speed, the lawn density, and the like. Also, taking the directional property of the work into consideration, that is, taking the directional property of the mowing into consideration, there is quite a lot of cases where work running with mowing and non-work running without mowing are repeated in the mowing work. Accordingly, control to make the rotation speed of the electric motor uniform as much as possible cannot effectively save the power consumption.

[Related Art 1] Japanese Patent Laid-Open Publication No. 2009-255840 (paragraphs [0027-0089]; FIG. 3)

[Related Art 2] Japanese Patent Laid-Open Publication No. 2010-184636 (paragraphs [0036-0117]; FIG. 10)

[Related Art 3] Japanese Patent Laid-Open Publication No. H09-201126 (paragraphs [0006-0036]; FIG. 5)

RIDING MOWER WITH BLADE MOTOR CONTROL

CROSS-REFERENCE TO RELATED APPLICATIONS

The present application claims priority under 35 U.S.C. §119 of Japanese Application No. 2011-052003, filed on Mar. 9, 2011, which is herein expressly incorporated by reference in its entirety.

BACKGROUND OF THE INVENTION

1. Field of the Invention

The present invention relates to a riding work vehicle that includes a vehicle body having a driver's seat; a driving wheel unit supporting the vehicle body; a work unit having a work device that performs work to a worked object around the vehicle body corresponding to running of the vehicle body; and a working electric motor that drives the work device.

2. Description of Related Art

One of such riding work vehicles described above is a riding electric mower having a mower unit to mow the lawn grass as the work unit. Riding electric mowers have a hybrid vehicle type in which an electric motor supplies rotation power to right and left driving rear wheels and supplies rotation power to a mowing blade of the mower unit, and a battery as an electric source of the electric motor is charged by an engine. Riding electric mowers also have an electric vehicle type that has no engine.

The hybrid vehicle type riding electric mower is described in Related Art 1, for example. The riding electric mower described in Related Art 1 has an electric motor in which right and left driving rear wheels are independently driven and controlled, and smooth turn is achieved by causing the rotation speed of the right and left driving rear wheels to be different from each other. In such a riding electric mower, there is no detailed description of rotation control of the mowing blade.

The electric vehicle type riding electric mower is described in Related Art 2. The riding electric mower described in Related Art 2 uses an electric motor as a driving source of right and left rear wheels that are main driving wheels; a running driving source and a steering driving source of right and left front caster wheels; and a driving source of a mowing blade that is a mowing rotation tool constructing a mower. In this riding electric mower, however, there is no detailed description of rotation control of the mowing blade.

A walking-type battery-powered electric mower operated by a person while walking is designed to efficiently utilize

SUMMARY OF THE INVENTION

In view of the above circumstances, an advantage of the present invention is to provide a riding work vehicle provided with control to reduce the power consumption of the electric work device performing work to a worked object around a vehicle body corresponding to running of the vehicle body.

An aspect of the present invention provides a riding work vehicle that includes a vehicle body having a driver's seat; a driving wheel unit supporting the vehicle body; a work unit having a work device that performs work to a worked object around the vehicle body corresponding to running of the vehicle body; a working electric motor that drives the work device; an electric motor controller controlling an operation of the working electric motor in a steady mode or a power saving mode in which consumed power is smaller than the steady mode; and a work load evaluator that evaluates load of the working electric motor. In the riding work vehicle, the electric motor controller operates the working electric motor in the power saving mode in a case where the load of the working electric motor evaluated by the work load evaluator is low load lower than a threshold value.

With this configuration, load on the working electric motor running in the steady mode is evaluated by the work load evaluator. Further, in a case where the evaluated load of the working electric motor is low load lower than a threshold value, the steady mode is moved into the power saving mode in which consumed power is smaller than the steady mode. Consequently, automatic moving into the power saving mode is performed when the work state becomes a state where no power is needed even if a driver is not aware of it. It is thus possible to securely reduce the power consumption and prevent the work efficiency from being deteriorated by reducing the power consumption.

According to one of the preferred embodiments of the present invention, the threshold value is set based on load evaluation of the working electric motor evaluated by the work load evaluator while the vehicle body is not running. In a case of a work vehicle that performs work to a worked object around the vehicle body while the vehicle body is running, it is generally possible to consider that there is no load on the working electric motor while the vehicle body is not running. It is thus possible to use the load on the working electric motor while the vehicle body is not running as a reference for judging low load or no load, that is, as a threshold. There is also an advantage that a state where the vehicle body is not running can be detected easily.

According to a preferred embodiment of the present invention to treat the load evaluation of the working electric motor with a value easy for processing, in particular, with a numerical value, the load evaluation of the working electric motor by the work load evaluator is a load evaluation value derived by using at least one of the supply current value to the working electric motor, the rotation number of the working electric motor, and the work amount to the worked object as an input parameter.

According to one of the preferred embodiments of the present invention, in order to reduce the chattering phenomenon of control caused by frequently repeating low load and high load, the load of the working electric motor is evaluated as low load on the condition that a state where the load of the working electric motor is lower than the threshold value continues for a predetermined period of time.

It is advantageous to frequently update the setting of the threshold value in a case where the work conditions or the work environment change such as a case where various work devices having different driving load are frequently exchanged or a case where a plurality of work devices are provided and one of them is selected and used appropriately. However, a state suitable for setting a threshold value does not necessarily occur frequently. According to one of the preferred embodiments of the present invention, in order to handle this situation, the threshold value is set by a default value that has been set in advance when the load evaluation of the working electric motor cannot be performed while the vehicle body is not running.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein:

FIG. 9 is a flow chart showing the flow of work load initial setting.

DETAILED DESCRIPTION OF PREFERRED EMBODIMENTS

The particulars shown herein are by way of example and for purposes of illustrative discussion of the mmbodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

Figure 1:
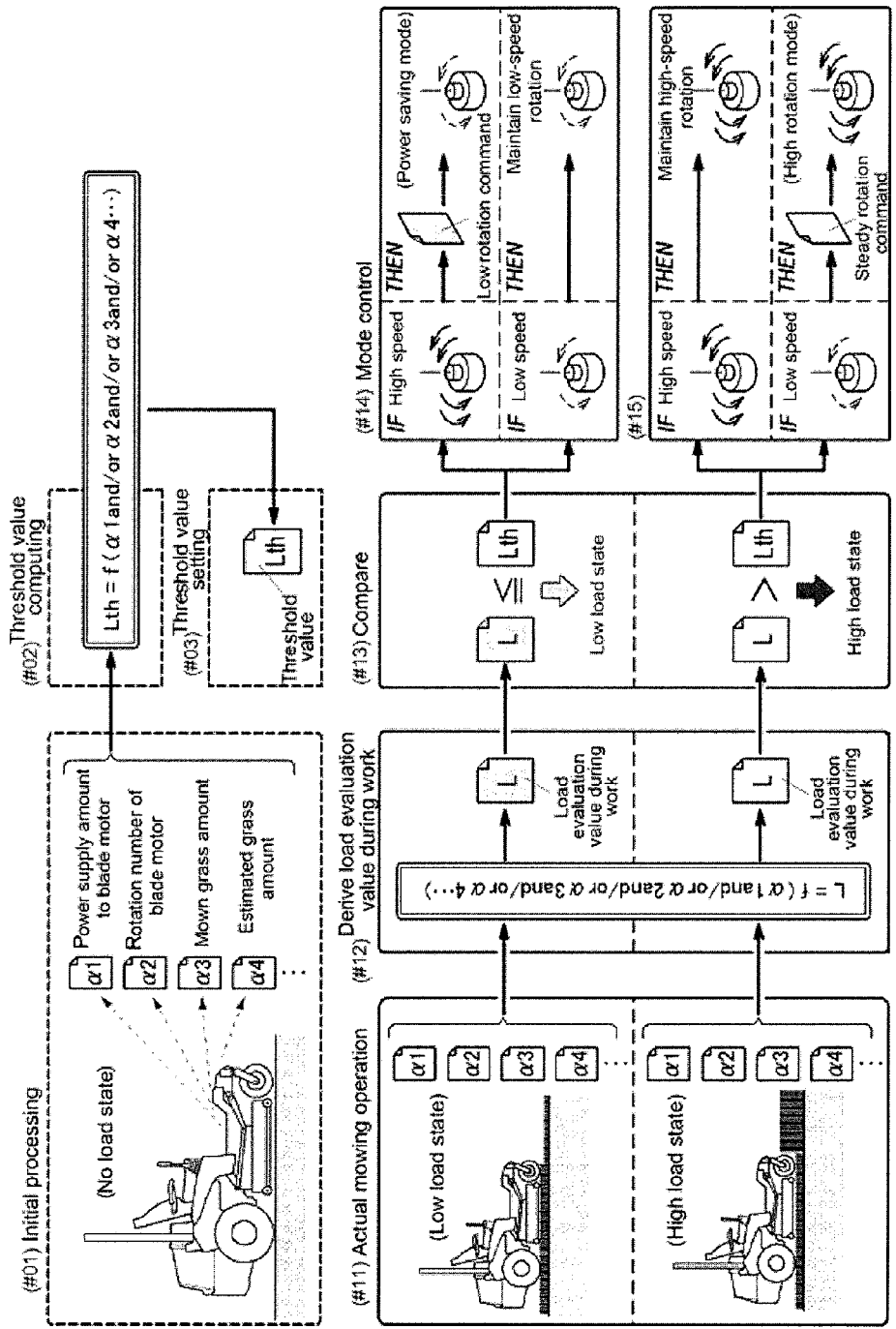
FIG. 1 is a diagram explaining the principle of control according to the present invention in which a working electric motor of a work unit is operated in a power saving mode in a case where the working electric motor only has low load less than a predetermined value.

Embodiments of the present invention will be explained below with reference to the drawings. Prior to explaining the specific configuration of the present invention, an explanation will be made on the basic principle of control that features the present invention with reference to FIG. 1, in which a working electric motor of a work unit is operated in a power saving mode when load on the working electric motor is evaluated and determined to be predetermined low load. Here, the electric work vehicle is a riding electric mower in which a vehicle body is provided with a mower unit as the work unit, and the working electric motor is a motor (blade motor) for a rotation blade that mows the lawn grass.

First, prior to mowing work performed by operating the riding electric mower, as initial processing, load on the blade motor in a state where there is no mowing load on the rotation blade such as a state of running on a road or a flat, or ceasing running in a lawn area is evaluated as a load state of the mower unit (#01). The parameters related to the load on the blade motor include the power supply amount to the blade motor; the rotation number of the blade motor; and the amount of mown grass discharged from the mower unit. According to the present invention, in a case where the load on the blade motor is no load or low load (hereinafter the word "low load" includes "no load"), the rotation number of the blade motor is reduced to be a low rotation number that is lower than a steady rotation number so as to achieve energy saving (power saving). In the initial processing, an evaluation threshold value is obtained to determine whether the blade motor has low load or high load (#02).

The evaluation threshold value can be obtained by one of the following various parameters or a combination thereof:

(1) α1: power supply amount to blade motor

A power supply amount slightly more than the power supply amount to the blade motor in which lawn grass as the worked object is outside the activity range of the rotation blade is set as a threshold value. Low-speed rotation is performed in a case of less than the threshold value, and steady rotation using a rotation speed higher than the low-speed rotation is performed in a case of more than or equal to the threshold value. In fact, the blade motor has heavy load when lawn grass is cut by the rotation blade, and thus the power supply amount to the blade motor becomes large. Consequently, by comparing the power supply amount to the blade motor detected at the time of being operated with the threshold value, it is possible to achieve control in which the blade motor is rotated at a high speed (steady rotation) when mowing is performed, and the blade motor is rotated at a low speed when no mowing is performed.

(2) α2: rotation number of blade motor (this rotation number is a rotation number per unit time, which means a rotation speed)

In a case of using a motor whose rotation number decreases as load (torque) increases, the detected rotation number can be used as is as a judgment reference. Specifically, a rotation number slightly more than the rotation number of the blade motor when no mowing is performed is set as a threshold value. Low-speed rotation is performed in a case of less than the threshold value, and steady rotation is performed in a case of more than or equal to the threshold value. With this, it is possible to achieve control in which the blade motor is rotated at a high speed (steady rotation) to generate a sufficient torque in a case of mowing that requires a large torque, and the blade motor is rotated at a low speed in a case where no mowing is performed and a large torque is not required.

(3) α3: amount of mown grass discharged from mower unit (=amount of lawn grass mown by rotation blade)

The load on the blade motor becomes large as the amount of mown grass discharged from the mower unit increases. It is thus possible to perform selection of high-speed rotation (steady rotation) and low-speed rotation of the blade motor based on the amount of mown grass discharged from the mower unit. Consequently, a state where the amount of mown grass discharged from the mower unit is substantially zero may be used as a threshold value for judgment.

(4) α4: estimated amount of lawn grass entering mower unit corresponding to running Although this is similar to (3), it is possible to provide a lawn grass amount detection sensor on the front side of the running direction of the mower unit and perform selection of high-speed rotation (steady rotation) and low-speed rotation of the blade motor based on a detection signal from the lawn grass amount detection sensor. A contact sensor or an image sensor can be used as the lawn grass amount detection sensor. Here, a state where the entering amount of lawn is substantially zero may be used as a threshold value for judgment.

An evaluation threshold value "Lth" is derived by using a function "f" created experimentally or empirically, or both, based on at least one of the above physical amounts (detection amounts) α1-α4 . . . in a state where the blade motor has substantially no load. Specifically, the evaluation threshold value can be expressed as Lth=f (α1 and/or α2 and/or α3 and/or α4 . . . ). The derived threshold value is set prior to mowing work in preparation for use in mowing work (#03). Incidentally, in a case where an appropriate physical amount to derive a threshold value cannot be obtained, a default threshold value stored in advance such as a threshold value at the time of previous work may be set.

When the initial setting processing such as setting of a threshold value is finished, actual mowing work is started by running in a lawn area while rotating the blade (#11). When the mowing work is started, at least one of the above physical amounts related to the load on the blade motor is detected, and a load evaluation value during work L=f (α1 and/or α2 and/or α3 and/or α4 . . . ) is derived by using the detected amount as an input parameter (#12).

The load evaluation value during work L is compared to a preset threshold value as follows (#13):

(1) In a case where the load evaluation value during work is equal to or less than the threshold value (L≤Lth), it is considered that the blade motor has low load (no load). When steady rotation (high-speed rotation) is performed to the blade motor, a command for low rotation is given to the blade motor, and thereby the blade motor is switched into activation in a low rotation mode (power saving mode) to save power (#14). When low-speed rotation is performed to the blade motor, the state is maintained.

(2) In a case where the load evaluation value during work is more than the threshold value (L>Lth), it is considered that the blade motor has high load. When low-speed rotation is performed to the blade motor, a command for steady rotation is given to the blade motor, and thereby the blade motor is switched into activation in a high rotation mode to obtain a larger torque (#15). When high-speed rotation is performed to the blade motor, the state is maintained.

Incidentally, in order to avoid inappropriate repetition of steady rotation and low rotation caused by instantaneous change in the load, it is preferable to employ a collateral condition that the comparison result of the load evaluation value during work L and the threshold value continues for a predetermined period of time, or use an average load evaluation value during work "Lave" instead of the load evaluation value during work L in which the average load evaluation value during work "Lave" is calculated by performing temporal averaging with a method such as moving average with respect to the temporally obtained load evaluation value L. However, taking a case of entering a lawn area while running in a low rotation mode (power saving mode) and the like into consideration, it is preferable that the blade motor is instantly switched into a high rotation mode so as to enable mowing when load equal to or greater than the threshold value "Lth" is generated in a low rotation mode.

Next, an explanation will be made on a detailed embodiment of the riding work vehicle which employs the above-described basic principle of control in which a working electric motor of a work unit is operated in a power saving mode when load on the working electric motor is evaluated and determined to be predetermined low load. Here, the riding work vehicle is a riding electric mower in which a vehicle body is provided with a mower unit as the work unit, and the working electric motor is a blade motor for a rotation blade that mows the lawn grass.

Figure 2:
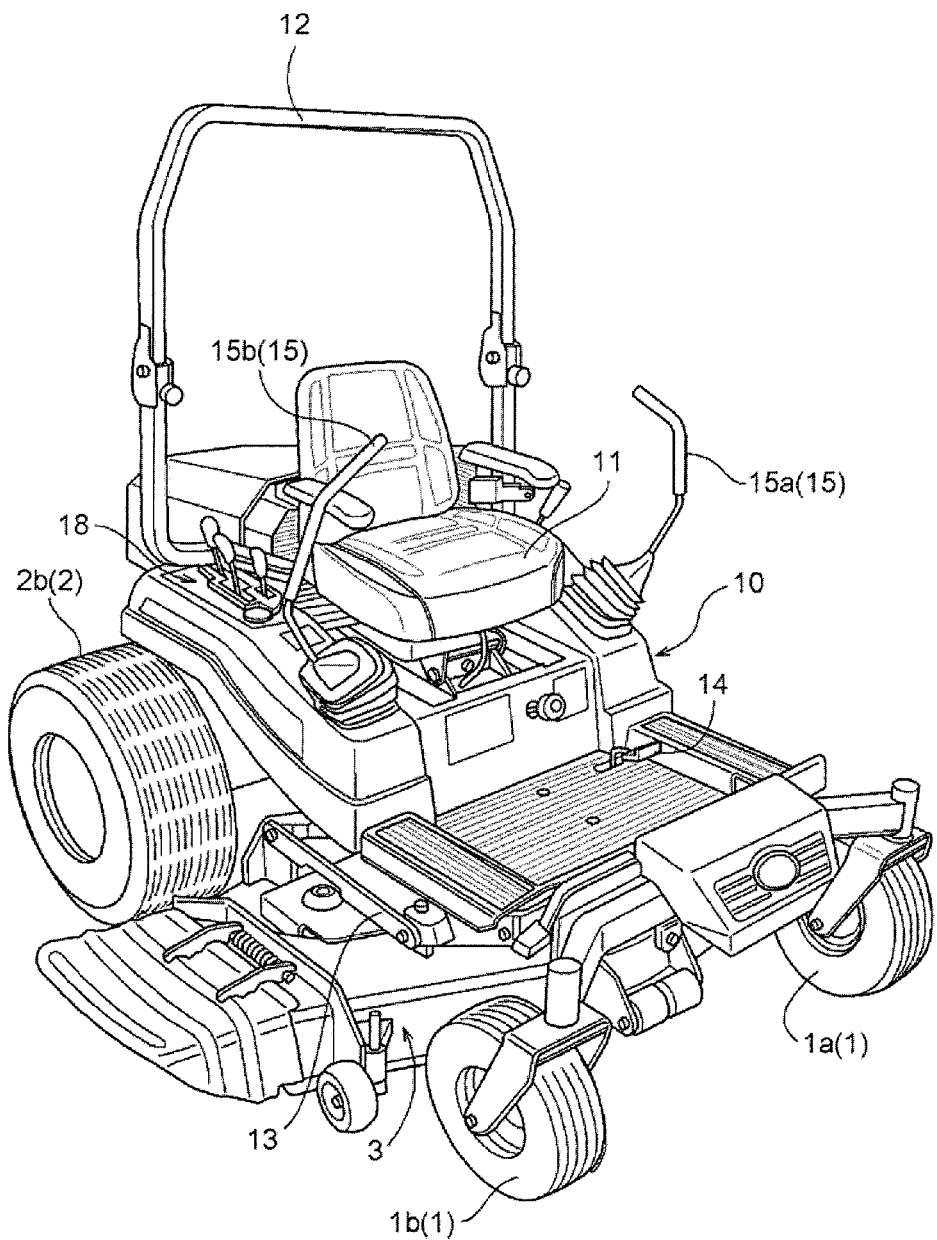
FIG. 2 is a perspective view illustrating an embodiment of a riding electric mower according to the present invention.
Figure 3:
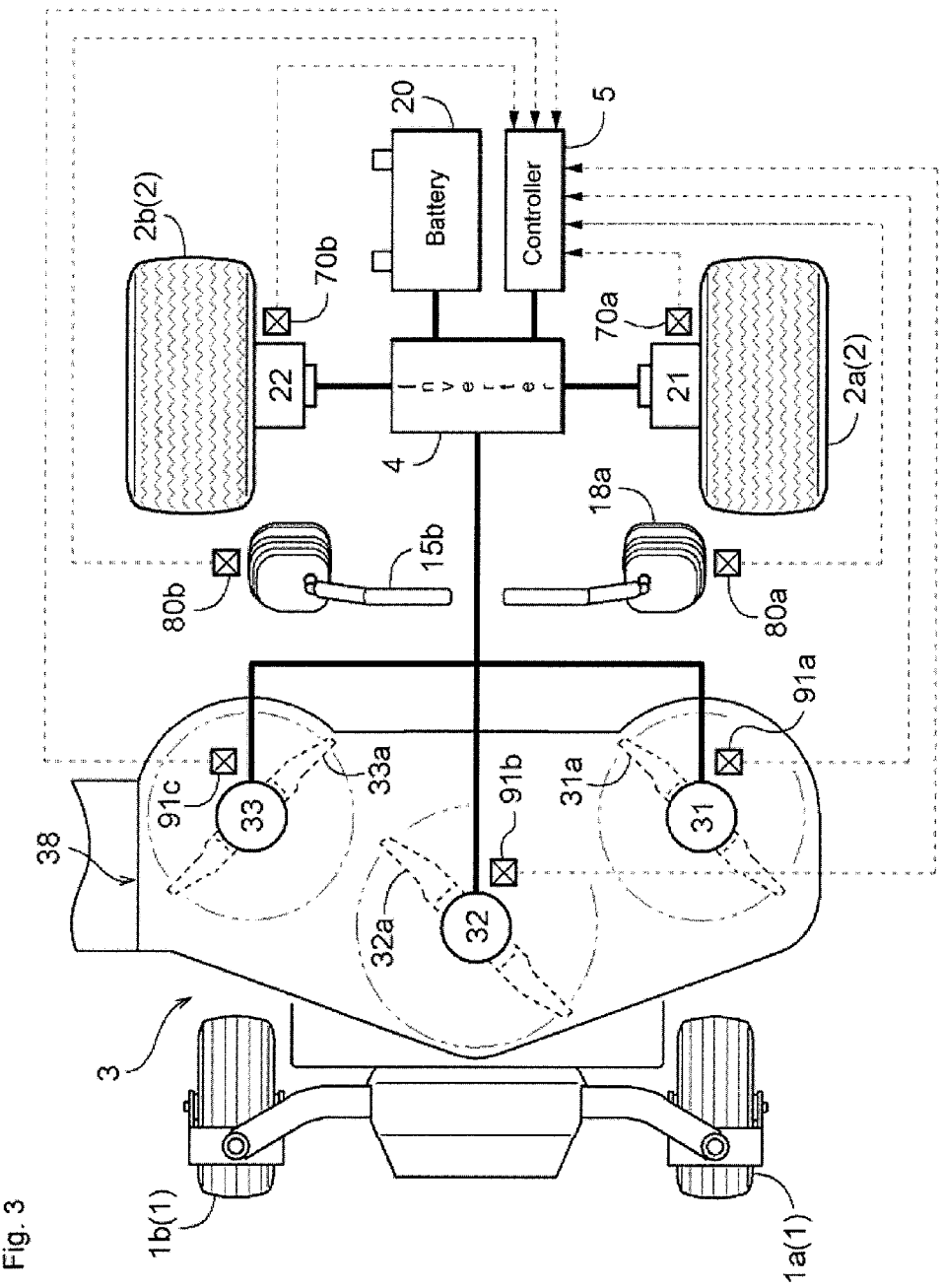
FIG. 3 is a systematic view illustrating an electric system and a power system of the riding electric mower.

The perspective view of such a riding electric mower is illustrated in FIG. 2, and an electric system and a power system of the riding electric mower is schematically illustrated in FIG. 3. The riding electric mower includes a front wheel unit 1 having a pair of right and left free rotating caster-type front wheels 1a and 1b; a rear wheel unit 2 having a pair of right and left driving rear wheels 2a and 2b; a vehicle body 10 supported by the front wheel unit 1 and the rear wheel unit 2; a battery 20 provided in the rear section of the vehicle body 10; a driver's seat 11 provided in front of the battery 20; a rollover protection frame 12 standing from the rear section of the driver's seat 11; a mower unit 3 hanging from the vehicle body 10 to be movable upward and downward by an elevating link mechanism 13 in the lower space of the vehicle body 10 between the front wheel unit 1 and the rear wheel unit 2. Power supply to the rear wheel unit 2 and the mower unit 3 is performed by an inverter 4 that operates based on control by a controller 5 called an ECU.

A floor plate is provided in front of the driver's seat 11 to rest the driver's foot thereon, and a brake pedal 14 is projected therefrom. A steering unit 15 is provided on both sides of the driver's seat 11. The steering unit 15 has a left steering lever 15a and a right steering lever 15b which swing around the horizontal swing axis in a vehicle body transverse direction. An electric operating panel 18 having an electric control switch button or switch lever is provided on one side of the driver's seat 11, that is, on the left side in this example.

A left wheel motor 21 and a right wheel motor 22 are installed, which are in-wheel motors rotating and driving the left rear wheel 2a and the right rear wheel 2b, respectively. The rotation speeds of the motors 21 and 22 are changed by the power amount supplied thereto through the inverter 4 independently. Therefore, the rotation speeds of the left rear wheel 2a and the right rear wheel 2b can be differentiated, and the direction of the riding electric mower is changed by the difference in the speed of the right and left rear wheels.

Figure 4:
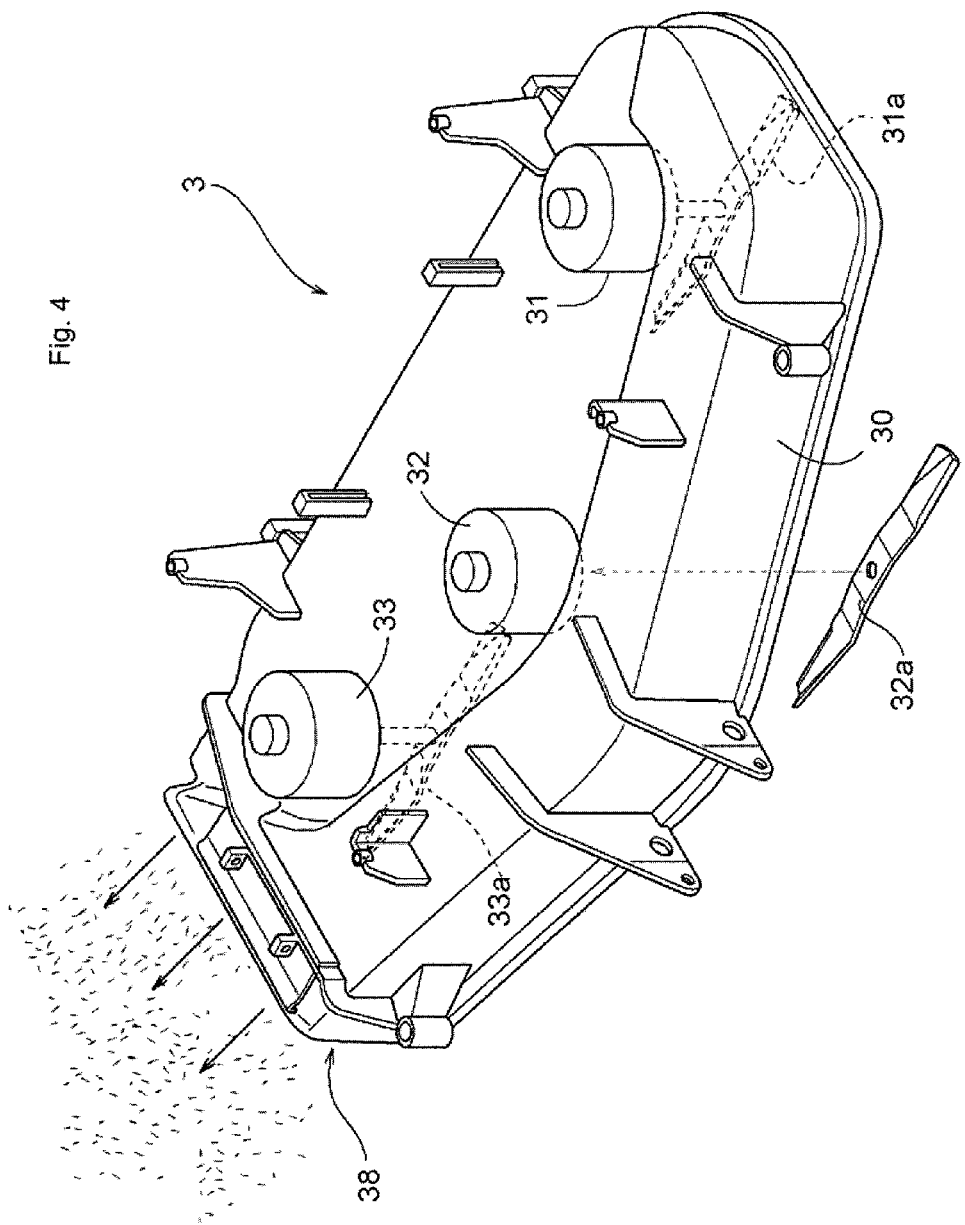
FIG. 4 is a perspective view illustrating an example of a mower unit.

As shown in FIG. 4, the mower unit 3 is a side discharge type having three blades. The mower unit 3 has a mower deck 30 and three rotation blades 31a, 32a, and 33a. The mower unit 3 itself is similar to a conventional one except that the three rotation blades 31a, 32a, and 33a are rotated and driven by blade motors 31, 32, and 33, respectively. On the outer side of the mower unit 3, gauge wheels are provided at four corners, and ground rollers are provided in the front and rear of the center. Baffle plates are provided on the inner side of the mower deck 30 to be on a front side with respect to the rotation blades 31a, 32a, and 33a, and vacuum plates are formed on the inner rear side of the mower deck 30, along the rear side of the rotation trajectory that the tip ends of the rotation blades 31a, 32a, and 33a draw. These are not shown in the drawings. A discharge outlet 38 is formed on a right side of the mower deck 30.

The mower deck 30 has a ceiling surface; a front longitudinal wall extending downward from a front edge section of the ceiling surface; a rear longitudinal wall extending downward from a rear edge section of the ceiling surface; and a side longitudinal wall extending downward from a side edge section of the ceiling surface. The three rotation blades 31a, 32a, and 33a are provided in parallel on the inner side of the mower deck 30 in a lateral direction. The three rotation blades 31a, 32a, and 33a are provided to form a triangle in a plan view such that the rotation blade 32a located in the center of the mower deck 30 in the lateral direction is displaced slightly forward. The rotation blade 31a is positioned to be farthest away from the discharge outlet 38 in the most upstream of a cut grass flowing direction. In this mower unit 3, the rotation blade 33a is positioned closest to the discharge outlet 38 in the most downstream of the cut grass flowing direction. The blade motors 31a, 32a, and 33a are respectively attached to the drive shafts of the blade motors 31, 32, and 33 fixed to the ceiling surface of the mower deck 30 through brackets which are not shown in the drawings. Incidentally, each of the rotation blades 31a, 32a, and 33a has a cutting edge on the both ends thereof. Further, a wind-creating vane is formed on a rear side of each cutting edge.

In mowing work, mown grass is cut with the rotation blades 31a, 32a, and 33a by running the riding electric mower while rotating the rotation blades 31a, 32a, and 33a, and guided to the vacuum plate and the baffle plate by wind created from the wind-creating vane of the rotation blades 31a, 32a, and 33a, sent to one lateral end side where the discharge outlet 38 is located through the inside of the mower deck 30, and discharged from the discharge outlet to the lateral outside of the mower deck 30.

As described above, in this embodiment, each of the blade motors 31, 32, and 33 can independently change the rotation speed by the amount of power supplied through the inverter 4. Here, however, activation is performed in a steady mode for rotating at a steady rotation speed (steady rotation number) that is high rotation, and in a low rotation mode for rotating at a low speed (low rotation number) that is slower than the steady rotation speed (steady rotation number) and consumes less power. It is not necessary to make the rotation speeds of the blade motors 31, 32, and 33 identical. The rotation speeds of the blade motors 31, 32, and 33 can be differentiated by making the rotation speed of the blade motor 31 that rotates the rotation blade 31a farthest away from the discharge outlet 38 higher than the rotation speed of the blade motor 33 that rotates the rotation blade 33a closest to the discharge outlet 38, for example. The rotation speed may be selected to be the best taking into consideration power saving and discharge/transfer efficiency of mown grass. For similar purposes, the rotation torque may be made larger in the blade motor closer to the discharge outlet 38 because the blade motor 33 of the rotation blade 33a closest to the discharge outlet 38 discharges cut grass from the other blade motors.

Inverter control is performed by the controller 5 to supply power to the left wheel motor 21 and the right wheel motor 22 for running, and the blade motors 31, 32, and 33 for mowing. The inverter 4 connected to the battery 20 has a blade power supplying section 40 for supplying identical or different power to the blade motors 31, 32, and 33; a left wheel power supplying section 41 for supplying power to the left wheel motor 21; and a right wheel power supplying section 42 for supplying power to the right wheel motor 22.

Figure 5:
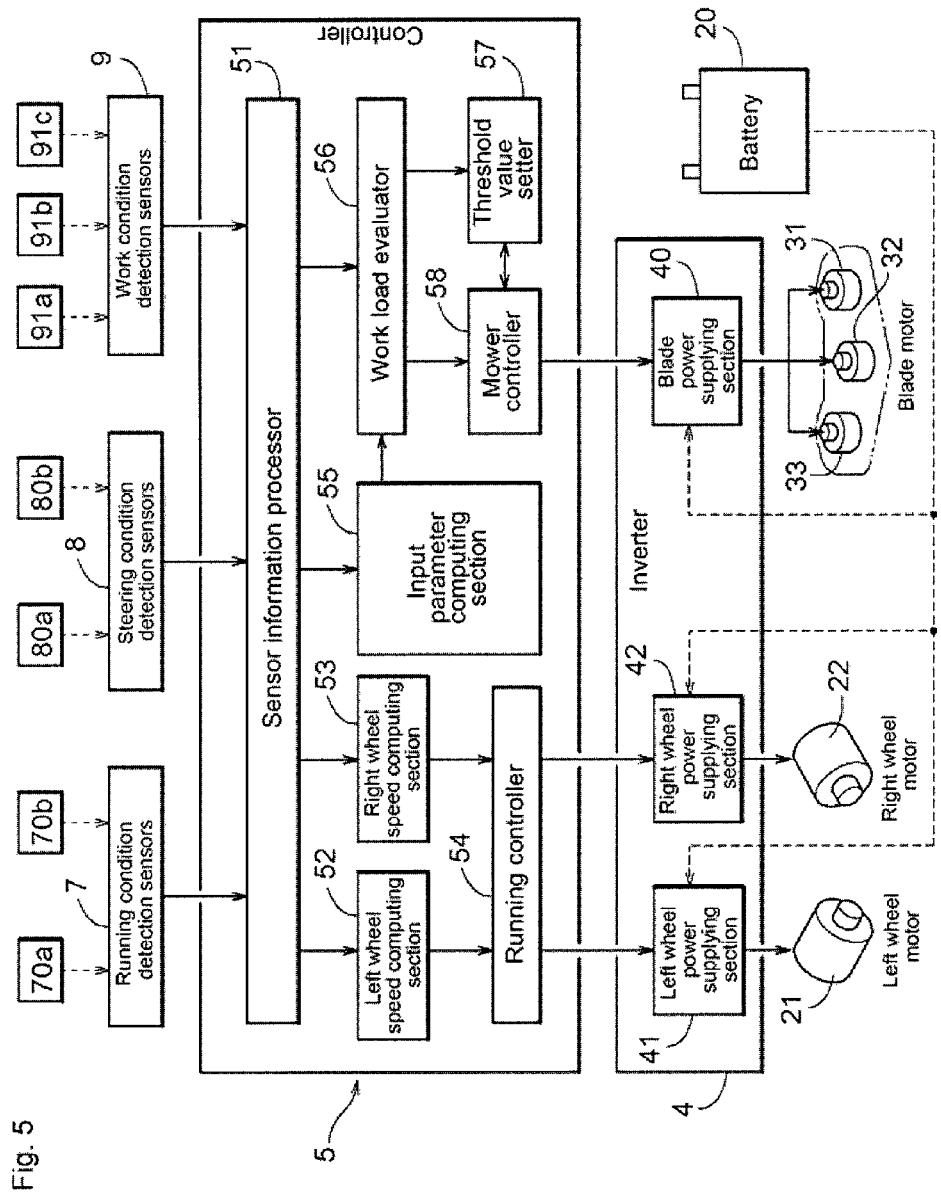
FIG. 5 is a block diagram illustrating functions of a controller.
Figure 6:
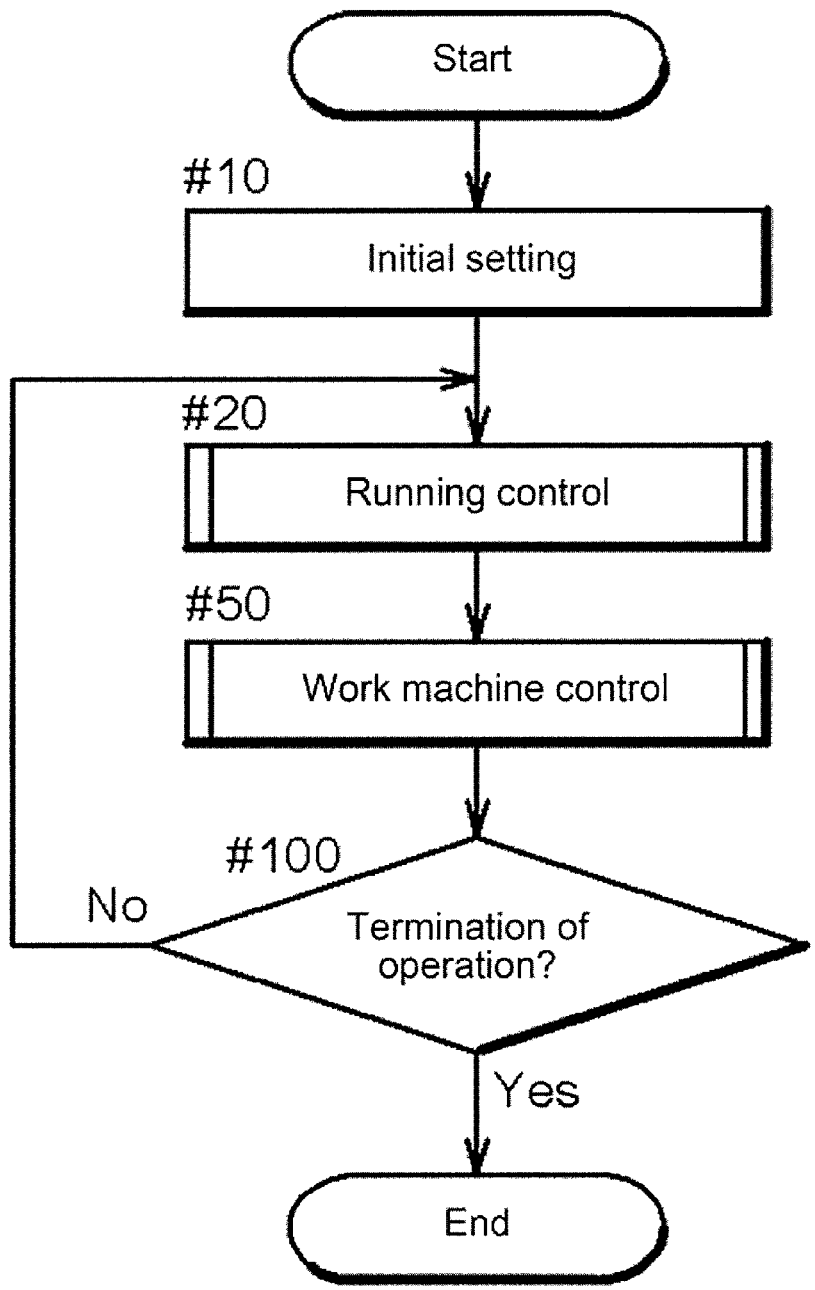
FIG. 6 is a flow chart showing the entire flow of control at the time of mowing work.
Figure 7:
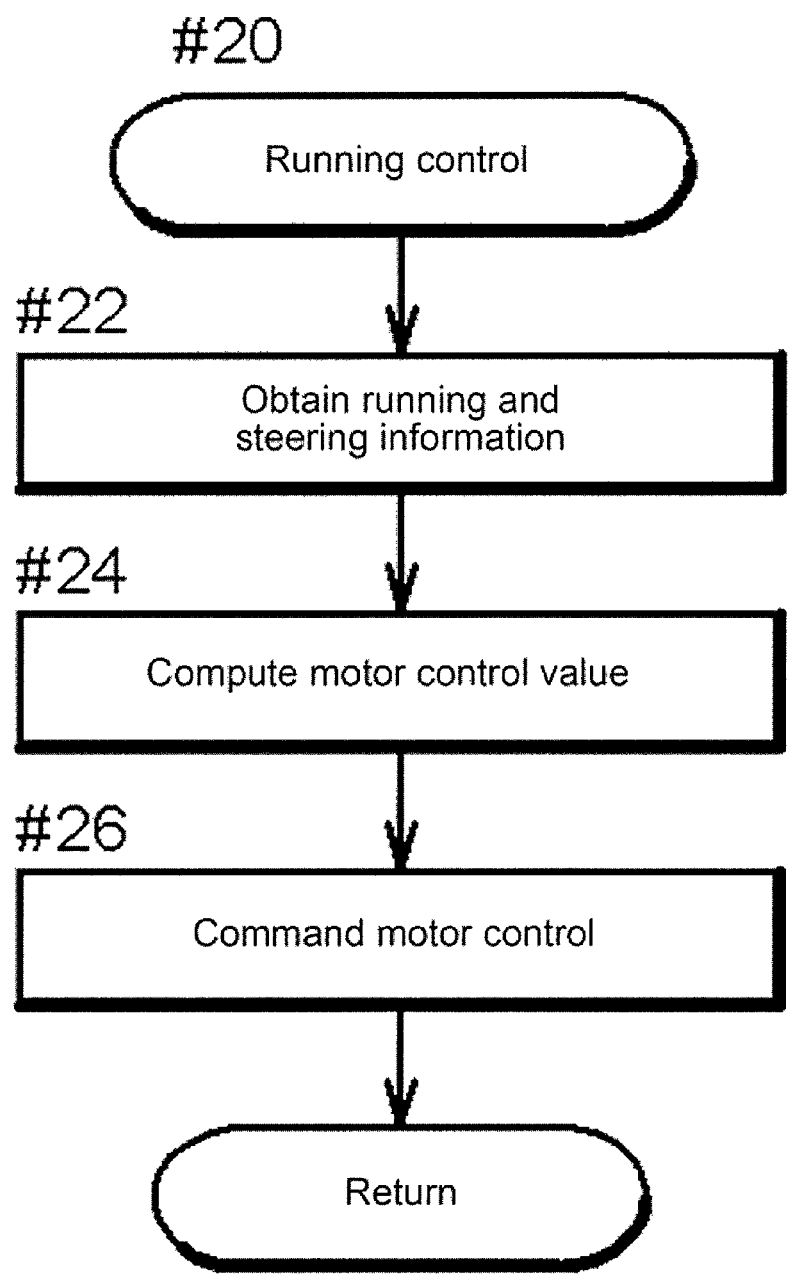
FIG. 7 is a flow chart showing the general flow of running control.
Figure 8:
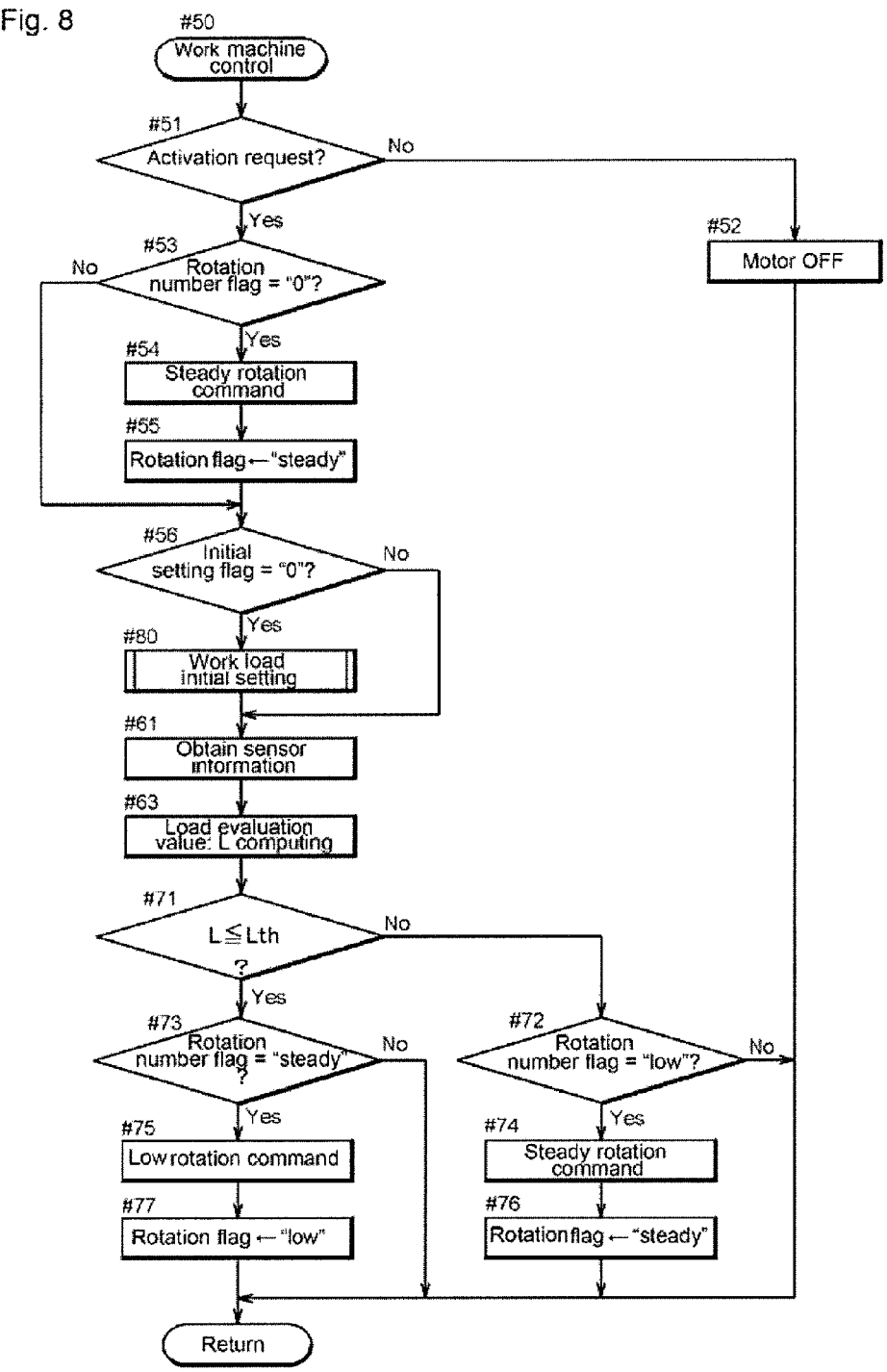
FIG. 8 is a flow chart showing the flow of controlling a work machine.

As shown in FIG. 5, the controller 5 is connected to running condition detection sensors 7, steering condition detection sensors 8, work condition detection sensors 9, and the inverter 4. The running condition detection sensors 7 include sensors to detect running information such as a left rear wheel rotation detection sensor 70a that detects the rotation number of the left rear wheel 2a and a right rear wheel rotation detection sensor 70b that detects the rotation number of the right rear wheel 2b. The steering condition detection sensors 8 include sensors to detect steering information such as a left steering angle detection sensor 80a that detects the swinging angle of the left steering lever 15a, a right steering angle detection sensor 80b that detects the swinging angle of the right steering lever 15b, and a brake detection sensor that detects the operation angle of the brake pedal 14. The work condition detection sensors 9 include blade rotation detection sensors 91a, 91b, and 91c that detect the rotation numbers of the blade motors 31, 32, and 33 or an ammeter that detects electric current flowing through the blade motors 31, 32, and 33, or both; a cut grass detection sensor that detects the amount of cut grass discharged from the discharge outlet 38 of the mower deck 30; and a cut grass estimation sensor that estimates the amount of lawn grass entering the mower deck 30 while running. In order to estimate the load of the blade motors 31, 32, and 33, however, one of them is enough. In this embodiment, the work condition detection sensors 9 include only the rotation detection sensors 91a, 91b, and 91c.

In the controller 5, a sensor information processor 51, a left wheel speed computing section 52, a right wheel speed computing section 53, a running controller 54, an input parameter computing section 55, a work load evaluator 56, a threshold value setter 57, a mower controller 58, and the like are constructed by executing a program. It may be possible to construct them by a hardware if needed. The sensor information processor 51 processes a sensor signal input from the running condition detection sensors 7, the steering condition detection sensors 8, and the work condition detection sensors 9, and converts the input into usable information inside the controller 5.

The left wheel speed computing section 52 calculates the rotation speed (rotation number) of the left rear wheel 2a, i.e., the rotation speed (rotation number) of the left wheel motor 21 based on operation information via the left steering angle detection sensor 80a that detects the operation amount of the left steering lever 15a by a driver. In this instance, a table or function showing the relationship between the operating position and the rotation speed is used. In a similar manner, the right wheel speed computing section 53 calculates the rotation speed (rotation number) of the right rear wheel 2b, i.e., the rotation speed (rotation number) of the right wheel motor 22 based on operation information via the right steering angle detection sensor 80b that detects the operation amount of the right steering lever 15b by a driver.

The running controller 54 provides the left wheel power supplying section 41 and the right wheel power supplying section 42 with a control signal to supply to the left wheel motor 21 and the right wheel motor 22 electric power necessary for achieving the rotation speed of the left wheel motor 21 and the rotation speed of the right wheel motor 22 calculated by the left wheel speed computing section 52 and the right wheel speed computing section 53. In this instance, when a slight difference in the target rotation speed between the left wheel motor 21 and the right wheel motor 22 occurs, in order to prevent the vehicle body from swinging to right and left, it is preferable to perform running control to avoid chattering by providing a dead zone, or perform running control to assume whether a driver intends to run straight or run with a slight turn and generate a control signal based on the assumption.

The input parameter computing section 55 generates an input parameter to estimate a particular work state or running state based on various sensor information obtained from the sensor information processor 51. For example, the input computing section 55 generates a parameter to check whether the mower unit has no load, which means that at least substantially no mowing work is performed, or a parameter to check whether the condition of lawn is a condition that imposes load more than usual in mowing work. It is also possible to generate a parameter to check whether it is running on a road, a farm, or a lawn area.

The work load evaluator 56 calculates load on the mower unit 3, i.e., a load evaluation value $L=f(\alpha 1 \text{ and/or } \alpha 2 \ldots)$ showing load on each of the blade motors 31, 32, and 33 from the relationship between the rotation speeds of the blade motors 31, 32, and 33 obtained by the sensor information processor 51 and the control signal to the blade motors 31, 32, and 33; the amount of cut grass; the electric current value flowing through the blade motors 31, 32, and 33 etc.

The threshold value setter 57 calculates a load evaluation value L when the mower unit has no load or low load. The threshold value setter 57 determines a specific value by using the load evaluation value L as a reference, and sets the specific value to be a threshold value "Lth" for judging no load or low load of the mower unit 3.

The mower controller 58 gives an appropriate control signal to the blade power supplying section 40 provided with an inverter circuit so as to rotate and drive the blade motors 31, 32, and 33 at a predetermined speed by inverter control. The blade motors 31, 32, and 33 are rotated at a predetermined speed by supplying appropriate electric power to the blade motors 31, 32, and 33 with the blade power supplying section 40 based on the control signal. Here, the mower controller 58 has at least two modes including a steady (high-speed rotation) mode in which the blade motors 31, 32, and 33 are rotated at a preset steady speed (high speed) and a power saving (low-speed rotation) mode in which the blade motors 31, 32, and 33 are rotated at a low speed. The blade motors 31, 32, and 33 are normally rotated in a steady mode. When the load evaluation value "L" showing load on the blade motors 31, 32, and 33 obtained by the work load evaluator 56 is less than the threshold value "Lth", the steady mode is changed into a power saving mode, so that the speed of the blade motors 31, 32, and 33 is lowered to save power. It is not necessary to make the rotation speeds of the blade motors 31, 32, and 33 identical. In addition, it is possible to stop one of the three motors.

The flow of the control in the mowing work by the riding electric mower configured above will be explained with reference to FIG. 6, FIG. 7, FIG. 8, and FIG. 9. When the key of the riding electric mower is turned on and thereby the controller 5 is activated, initial setting processing such as initialization of a flag, a timer, and the like, or setting of a default value is performed (#10). Next, running control (#20) and work machine control (#50) to control the mower unit 3 are performed until termination of the operation (#100, Yes—branch).

In the running control (#20), the sensor information processor 51 processes a sensor signal from the running condition detection sensors 7 or the steering condition detection sensors 8 to generate information on running and steering (internal signal) (#22). Based on this information, a control value is computed to determine the power supply amount to the left wheel motor 21 and the right wheel motor 22 (#24), and output to the inverter 4 as a motor control command (#26).

In the work machine control (#50), first, whether an activation request of the work machine, i.e., an activation request to the mower unit 3 is input or not is checked (#51). This check is performed by determining the condition of a mower ON/OFF switch provided in the electric operating panel 18, for example. In a case where there is no activation request to the mower unit 3 (#51, No—branch), the blade motors 31, 32, and 33 in operation are stopped (#52), and the processing is ended. In a case where there is an activation request to the mower unit 3 (#51, Yes—branch), the content of a rotation number flag is checked (#53). The rotation number flag shows a setting condition of the control mode of the blade motors 31, 32, and 33. It is set as "steady" in a case of setting a steady rotation (high rotation) mode, and it is set as "low" in a case of setting a power saving (low rotation) mode. In this embodiment, since rotation is controlled in the steady mode at the time of starting work, "0" is set as an initial value of the rotation number flag. Specifically, the content of the rotation number flag is "0" at the time of starting work (#53, Yes—branch), a steady rotation command is output to steadily rotate the blade motors 31, 32, and 33 (#54), and the rotation number flag is set as "steady" (#55). Since the content of the rotation number flag is not "0" thereafter (#53, No—branch), steps #54 and #55 are not performed.

Next, the content of an initial setting flag is checked (#56). The initial setting flag is set to be "1" in a case where the threshold value "Lth" is set to determine whether the mower unit 3 is in a high load state or a low load (no load) state, and set to be "0" in a case where the threshold value "Lth" is not set. In a case where the content of the initial setting flag is "0" (#56, Yes—branch), therefore, work load initial setting processing is performed to set the threshold value "Lth" as described below (#80). In a case where the content of the initial setting flag is "1" (#56, No—branch), work load initial setting processing is omitted.

With this, rotation speed control of the blade motors 31, 32, and 33 is performed as actual control of the work machine. First, sensor information on the work state information processed and generated in the sensor information processor 51 is obtained (#61), and a load evaluation value $L=f(\alpha 1 \text{ and/or } \alpha 2 \ldots)$ is computed by using one or more input parameter $\alpha 1$, $\alpha 2$ obtained from the sensor information (#63). The obtained load evaluation value L is compared to the threshold value "Lth" (#71). The threshold value "Lth" is a load evaluation value corresponding to a low load state or no load state of the mower unit 3, i.e., the blade motors 31, 32, and 33. Consequently, in a case of $L \leq (Lth+\Delta L)$ ($\Delta L$ is an adjustment value), it is possible to determine that the blade motors 31, 32, and 33 are in a low load state or no load state. In a case of $L > (Lth+\Delta L)$ ($\Delta L$ is an adjustment value), it is possible to determine that the blade motors 31, 32, and 33 are in a high load state.

Thus, in a case of $L \leq (Lth+\Delta L)$ (#71, Yes—branch), the content of the rotation number flag is checked (#73). In a case where the content of the rotation number flag is "steady" (high rotation) (#73, Yes—branch), a low rotation command is output (#75) so as to move into a power saving mode and thereby drive the blade motors 31, 32, and 33 with low rotation. Further, the rotation flag is set to be "low" (#77), and this routine is finished. In a case where the content of the rotation number flag is not "steady" (#73, No—branch), that is, activation is performed in a power saving mode, this routine is finished directly.

In a case of L>(Lth+ΔL) (#71, No—branch), the content of the rotation number flag is checked (#72). In a case where the content of the rotation number flag is "low" (low rotation: power saving mode) (#72, Yes—branch), a steady rotation command is output (#74) so as to move into a steady mode and thereby drive the blade motors 31, 32, and 33 with steady rotation (high rotation). Further, the rotation flag is set to be "steady" (#76), and this routine is finished. In a case where the content of the rotation number flag is not "low" (#72, No—branch), that is, where activation is performed in a steady mode, this routine is finished directly.

Next, with reference to FIG. 9, an explanation will be made on a routine to perform work load initial setting (#80). First, it is checked whether the condition is met to perform the work load initial setting for setting a threshold value that determines whether the mower unit 3 has low load (no load) or high load (#81). Since the condition that the mower unit 3 has low load (no load) must be met here, it is checked whether (1) the vehicle body is in a ceased state, (2) the amount of discharged mown lawn is zero, (3) it runs on a road or passage where there is no lawn grass, (4) the mower deck 30 is stored in an elevated position, and the like. In a case where the condition is not met (#81, No—branch), a preset value or a threshold value that has been set in previous work is provisionally set as a default threshold value "Lth" of this time (#82), and this routine is finished.

In a case where the condition is met (#81, Yes—branch), the input parameter computing section 55 obtains sensor information from the sensor information processor 51 so as to calculate at least one of the input parameters α1, α2 (#83) and compute a load evaluation value L=f(α1 and/or α2 . . . ) by using the parameter (#84). The threshold value "Lth" is computed from the obtained load evaluation value L in an actual low load state (no load state) (#85). The obtained load evaluation value L may be used as the threshold value "Lth" without any change. When the determined threshold value "Lth" is set in the threshold value setter 57 (#86), the initial setting flag is set to be "1" (#87), it is considered that a new threshold value has been set, and this routine is finished.

In the flow of the control described above, the blade motors 31, 32, and 33 included in the mower unit 3 are treated as one motor to simplify the explanation. However, a different control method can be used as follows:

(a) A common or exclusive threshold value "Lth" is set with respect to each motor, and mutually independent load-rotation control is performed. It thus happens that one of the motors may be driven with low rotation and another motor may be driven with high rotation.

(b) Control by majority is performed in which all the motors are driven with low rotation in a case where the number of the motors considered to have load lower than the common or exclusive threshold value "Lth" is in the majority.

(c) All the motors are driven with low rotation in a case where all the motors are considered to have load lower than the common or exclusive threshold value "Lth". In other words, all the motors are kept in steady rotation unless there is at least one motor that is considered to have load equal to or greater than the threshold value "Lth".

Alternative Embodiment (1) In the above-described embodiment, the power supply amount to the working electric motor is switched in two stages based on the load. However, it may be possible to divide into more stages so as to achieve fine power saving control. Also, it may be possible to adjust the power supply amount without any step corresponding to the load.

(2) In the above-described embodiment, the threshold value "Lth" that has been set once is used as a fixed value until a new one is obtained and set. However, it may be possible to use an active threshold value that varies within a predetermined range based on change in the environment and the like.

(3) In the above-described embodiment, the threshold value "Lth" is set based on a work load initial setting routine. However, the threshold value "Lth" may be set/changed artificially by a threshold value setter provided in the electric operating panel 18 in the operation section, and automatic switching of a steady mode and a power saving mode may be performed by the artificially-set threshold value. Automatic switching of a steady mode and a power saving mode may be performed only by a threshold value that has been set and stored in the controller 5 in advance.

(4) The above-described riding work vehicle is a full electric vehicle in which the driving wheel unit is performed by an electric motor. However, it may be possible to use a hybrid vehicle in which an engine (internal-combustion engine) is installed, and the driving wheel unit is driven by driving force of the engine or electric power from an electric generator rotated by driving force of the engine. It may also be possible to use an engine vehicle in which the driving wheel unit is driven by an engine and the working electric motor is driven by a battery.

(5) The above-described embodiment is an example of a riding electric mower in which the work unit is the mower unit 3. The riding work vehicle to which the present invention can be applied includes a cultivator, a tractor, a rice planter, a combine, a civil engineering and construction machine, and a snow plow as well as a mower.

The present invention can be used for a riding work vehicle in which work is performed while the power supply amount to a working electric motor for driving a work device is increased or decreased based on load change.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:
1. A riding mower comprising:
a vehicle body having a driver seat;
a driving wheel unit supporting the vehicle body;
a mower unit comprising:
at least one blade structured and arranged to cut grass;
at least one blade motor structured and arranged to cause rotation of the at least one blade; and at least one work condition detection sensor structured and arranged to detect a load of the at least one blade motor;

at least one of:
- at least one running condition detection sensor structured and arranged to detect or sense a running condition of the driving wheel unit; or
- at least one steering condition detection sensor structured and arranged to detect or sense a steering condition; and a sensor information processor structured and arranged to receive signals from:
- the at least one work condition detection sensor; and
- the at least one running condition detection sensor and/or the at least one steering condition detection sensor;

a mower controller that controls an operation of the at least one blade motor in one of a steady mode and a power saving mode in which consumed power is smaller than the steady mode; and a work load evaluator that evaluates the load of the at least one blade motor, wherein the mower controller operates the at least one blade motor in the power saving mode when the load of the at least one blade motor is determined to be below a threshold value and using information from the work load evaluator, and wherein the at least one work condition detection sensor also senses an amount of rotation of the at least one blade motor.

2. The riding mower of claim 1, wherein the sensor information processor, the work load evaluator and the mower controller are arranged in a controller mounted to the riding mower.

3. The riding mower of claim 1, wherein the at least one work condition detection sensor also senses at least one of:
- amount of grass discharged from the mower unit; or
- estimated amount of grass entering the mower unit.

4. The riding mower of claim 1, wherein the threshold value is set based on load evaluation of the at least one blade motor while the vehicle body is not moving and is evaluated by the work load evaluator.

5. The riding mower of claim 1, wherein the at least one blade motor comprises plural blade motors.

6. The riding mower of claim 5, wherein the plural blade motors can rotate one of:
- independent of one another;
- at a same speed; or
- at different speeds.

7. The riding mower of claim 5, wherein the plural blade motors are structured and arranged to at least one of:
- operate according to a common threshold value;
- utilize mutually independent load-rotation control; or
- operate such that one blade motor rotates with lower rotation speed than another blade motor.

8. The riding mower of claim 5, wherein all of the plural blade motors are structured and arranged to rotate with lower rotation speed when a majority of the blade motors are determined to have a load that is lower than the threshold value.

9. The riding mower of claim 8, wherein the threshold value is a common threshold value.

10. The riding mower of claim 5, wherein all of the plural blade motors are structured and arranged to rotate with lower rotation speed when all of the blade motors are determined to have a load that is lower than the threshold value.

11. The riding mower of claim 10, wherein the threshold value is a common threshold value.

12. The riding mower of claim 5, wherein all of the plural blade motors are structured and arranged to rotate with a steady speed unless at least one of the blade motors are determined to have a load that is equal to or greater than the threshold value.

13. The riding mower of claim 5, wherein the mower unit comprises a discharge outlet and one of the plural blade motors is arranged closer to the discharge outlet than other of the plural blade motors, and wherein the one of the plural blade motors operates at higher rotation torque than the other of the plural blade motors.

14. The riding mower of claim 13, wherein all of the plural blade motors are structured and arranged to rotate with a steady speed unless at least one of the blade motors is determined to have a load that is equal to or greater than the threshold value.

* * * * *